(12) United States Patent
Dirac et al.

(10) Patent No.: US 10,635,973 B1
(45) Date of Patent: Apr. 28, 2020

(54) RECOMMENDATION SYSTEM USING IMPROVED NEURAL NETWORK

(71) Applicant: Amazon Technologies, Inc., Seattle, WA (US)

(72) Inventors: Leo Parker Dirac, Seattle, WA (US); Rejith George Joseph, Seattle, WA (US); Vijai Mohan, Seattle, WA (US); Oleg Rybakov, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 928 days.

(21) Appl. No.: 15/195,515

(22) Filed: Jun. 28, 2016

(51) Int. Cl.
*G06N 3/08* (2006.01)
*G06N 5/02* (2006.01)
*G06N 20/00* (2019.01)
*G06Q 50/00* (2012.01)
*H04L 29/08* (2006.01)
*H04L 12/58* (2006.01)

(52) U.S. Cl.
CPC .............. *G06N 3/08* (2013.01); *G06N 5/022* (2013.01); *G06N 20/00* (2019.01); *G06Q 50/01* (2013.01); *H04L 51/24* (2013.01); *H04L 51/32* (2013.01); *H04L 51/36* (2013.01); *H04L 67/26* (2013.01)

(58) Field of Classification Search
CPC ........ G06N 20/00; G06N 20/10; G06N 20/20; G06N 3/08; G06N 5/022; G06Q 50/01; H04L 51/24; H04L 51/32; H04L 51/36; H04L 67/26

USPC ............................................... 706/12, 20, 25
See application file for complete search history.

(56) References Cited

U.S. PATENT DOCUMENTS

| | | | | |
|---|---|---|---|---|
| 8,060,463 | B1* | 11/2011 | Spiegel | G06Q 30/02 707/609 |
| 2016/0316242 | A1* | 10/2016 | Hirsch | H04N 21/4405 |
| 2017/0134516 | A1* | 5/2017 | Gutman | H04L 67/26 |
| 2017/0161633 | A1* | 6/2017 | Clinchant | G06N 20/00 |
| 2017/0304732 | A1* | 10/2017 | Velic | G06K 9/00201 |
| 2017/0364823 | A1* | 12/2017 | Ilic | H04L 51/24 |

* cited by examiner

*Primary Examiner* — Shane D Woolwine
(74) *Attorney, Agent, or Firm* — Kilpatrick Townsend & Stockton LLP (57) ABSTRACT

Techniques described herein are directed to improved artificial neural network machine learning techniques that may be employed with a recommendation system to provide predictions with improved accuracy. In some embodiments, item consumption events may be identified for a plurality of users. From these item consumption events, a set of inputs and a set of outputs may be generated according to a data split. In some embodiments, the set of outputs (and potentially the set of inputs) may include item consumption events that are weighted according to a time-decay function. Once a set of inputs and a set of outputs are identified, they may be used to train a prediction model using an artificial neural network. The prediction model may then be used to identify predictions for a specific user based on user-specific item consumption event data.

20 Claims, 8 Drawing Sheets

RECOMMENDATION SYSTEM USING IMPROVED NEURAL NETWORK

BACKGROUND

The goal of a recommendation system is to produce relevant and personalized recommendations for users based on historical data. While there are a plethora of techniques, most fall under either one or a hybrid of collaborative filtering or content-based filtering. Collaborative filtering techniques take advantage of large volumes of user and item consumption data to identify implicit interaction relationships between the user and an item. Content-based filtering focuses on explicit relationships amongst the items and preferences of the user.

When implementing a recommendation system that uses collaborative filtering, there are multiple techniques available for processing the large volumes of user and item consumption data. One such technique, neural network, is a machine-learning algorithm inspired by the neurological structure of the brain. A neural network typically comprises an input layer, one or more hidden layer(s) and an output layer. The nodes in each layer connect to nodes in the subsequent layer and the strengths of these interconnections are typically learnt from data during the training process.

However, current recommendation systems that utilize neural network techniques are often limited to providing recommendations for only those items included in the output layer of a generated prediction model (e.g., item consumption data provided as a set of outputs). This is not ideal since most item providers would like to provide recommendations for a broader range of items.

BRIEF DESCRIPTION OF THE DRAWINGS

Various embodiments in accordance with the present disclosure will be described with reference to the drawings, in which:

FIG. 5 depicts examples of timeline and data splits that may be used in generating a set of inputs and a set of outputs to be used in machine learning techniques in accordance with some embodiments of the disclosure;

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein are directed to a recommendation system that utilizes machine learning techniques to predict future item consumption events based on past item consumption data. To do this, the machine learning techniques may be used to generate a prediction model from historical item consumption data from a large number of users and then apply that prediction model to item consumption data for a particular user. In some embodiments, the machine learning technique used may separate the historical item consumption data into both inputs and outputs. This may be done, for example, based on date (e.g., items consumption events prior to a given date are treated as inputs and items consumption events after that date are treated as outputs). In some embodiments, the outputs may include the item consumption events in the item consumption data, but at least some of those item consumption events may be subject to a time-decay function.

For example, a neural network machine learning technique may be used to generate a prediction model using a set of inputs that includes a number of items purchased before a certain date by a large number of users, and a set of outputs that includes the items purchased after that date, as well as each of the items purchased before that date subjected to a time-decay function. The prediction model may then be used by a recommendation system to identify potential future item purchases by a specific user based on that user's item purchase history. In some embodiments, the recommendation model may account for item popularity by adjusting an item consumption events by a weight that is inversely proportional to the item's popularity. In some embodiments, the recommendation model may control for an imbalance between a number of consumption events and a number of items by using a constant weight in the cost function.

Figure 1:
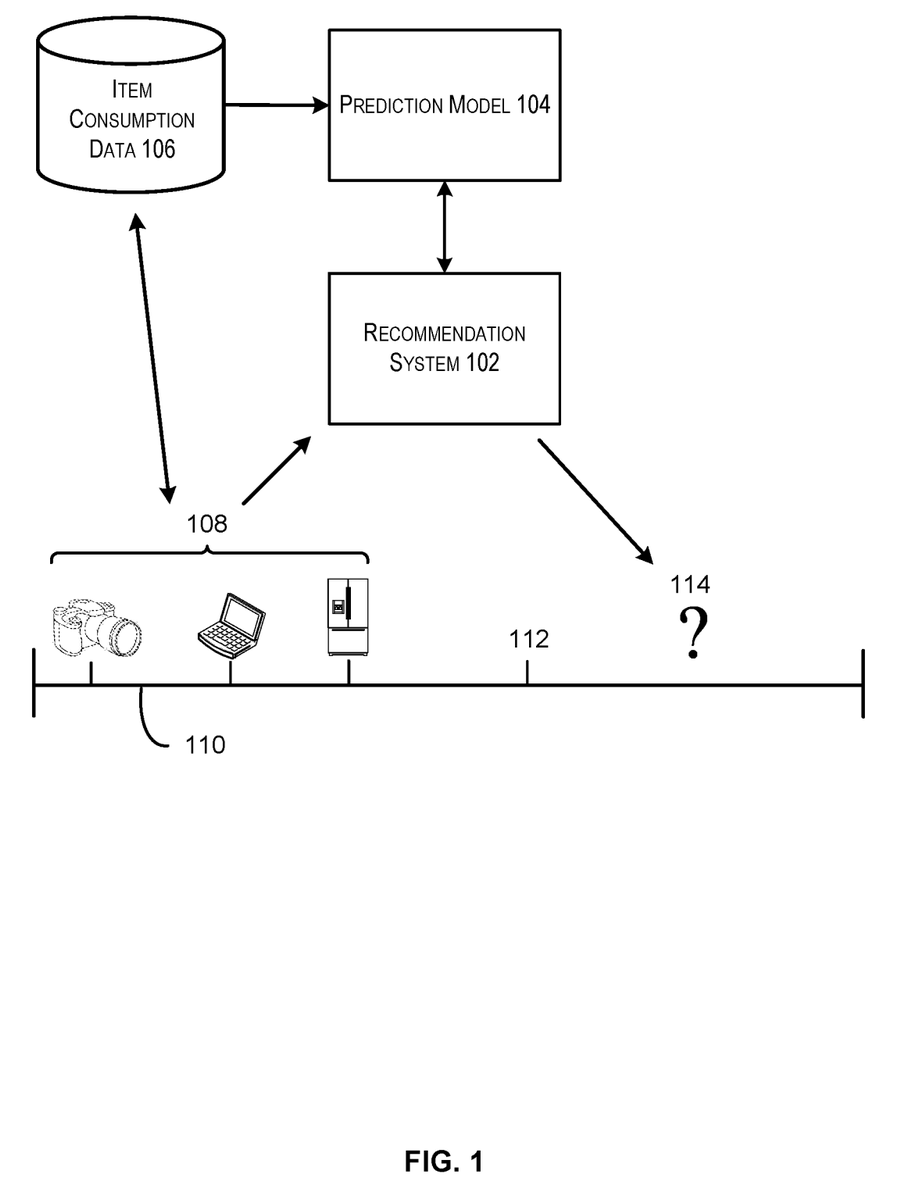
FIG. 1 depicts an illustrative example of a recommendation system that may be implemented in accordance with at least some embodiments.

FIG. 1 depicts an illustrative example of a recommendation system that may be implemented in accordance with at least some embodiments. In FIG. 1, a recommendation system 102 may include computer executable instructions that that implement one or more machine learning techniques to create a prediction model 104 that may be used to predict item consumption events based on item consumption data 106.

A machine learning technique may use any suitable algorithm or set of algorithms that, when executed, generate a prediction model from provided data. For example, a machine learning technique may generate a prediction model based on identified data patterns within the provided data. A prediction model may use any suitable system capable of receiving input and providing a prediction. For example, a prediction model may include a function or algorithm.

An item may be any suitable good or service, to include digital goods and services. For example, an item may comprise a movie. An item consumption event may be any event in which an item is consumed (e.g., purchased, viewed, used, clicked on, interacted with, etc.). Using the above example in which the item comprises a movie, a purchase of the movie or viewing of the movie may be an item consumption event. In some embodiments, an item consumption event may include an identifier for the item (e.g., an item number, stock keeping unit (SKU), Amazon Standard Identification Number (ASIN), etc.), a date of the consumption event, an indication of the type of consumption, or any other suitable information. Item consumption data may include item consumption events associated with a plurality of users (e.g., a consumer base for an electronic retailer).

The recommendation system 102 may receive an indication of user-specific item consumption events 108 (e.g., item consumption events that are each associated with a single user). Each of the user-specific item consumption events 108 may be stored in, and maintained by, the item consumption data 106 with respect to a timeline 110. For example, each item consumption event in item consumption data 106 may be associated with a timestamp or other suitable date/time indicator. The recommendation system 102 may receive user-specific item consumption events 108 that occur before a target date 112 in order to generate a consumption event prediction 114. In some embodiments, the target date 112 may be a current date, such that the consumption event prediction 114 represents a future item consumption event by the user associated with the user-specific item consumption events 108. In some embodiments, the target date 112 may be a past date, such that the consumption event prediction 114 may be compared to actual item consumption events occurring after the target date 112 in order to hone the prediction model 104 (e.g., adjust variables and/or assumptions used by the machine learning technique in generating a prediction model 104).

In some embodiments, the consumption event prediction 114 may be also be generated based on item features and/or user features. For example, when generating a consumption event prediction 114, a recommendation system 102 may take into account features related to an item, such as the item's cost, popularity, availability, time of purchase, or any other suitable item-related features. In another example, a user's demographic data may be taken into account when generating a consumption event prediction 114 specific to that user, such as the user's age, income level, level of education, or any other suitable demographic details. Likewise, item features and/or user features may be taken into account when generating a prediction model 104.

Figure 2:
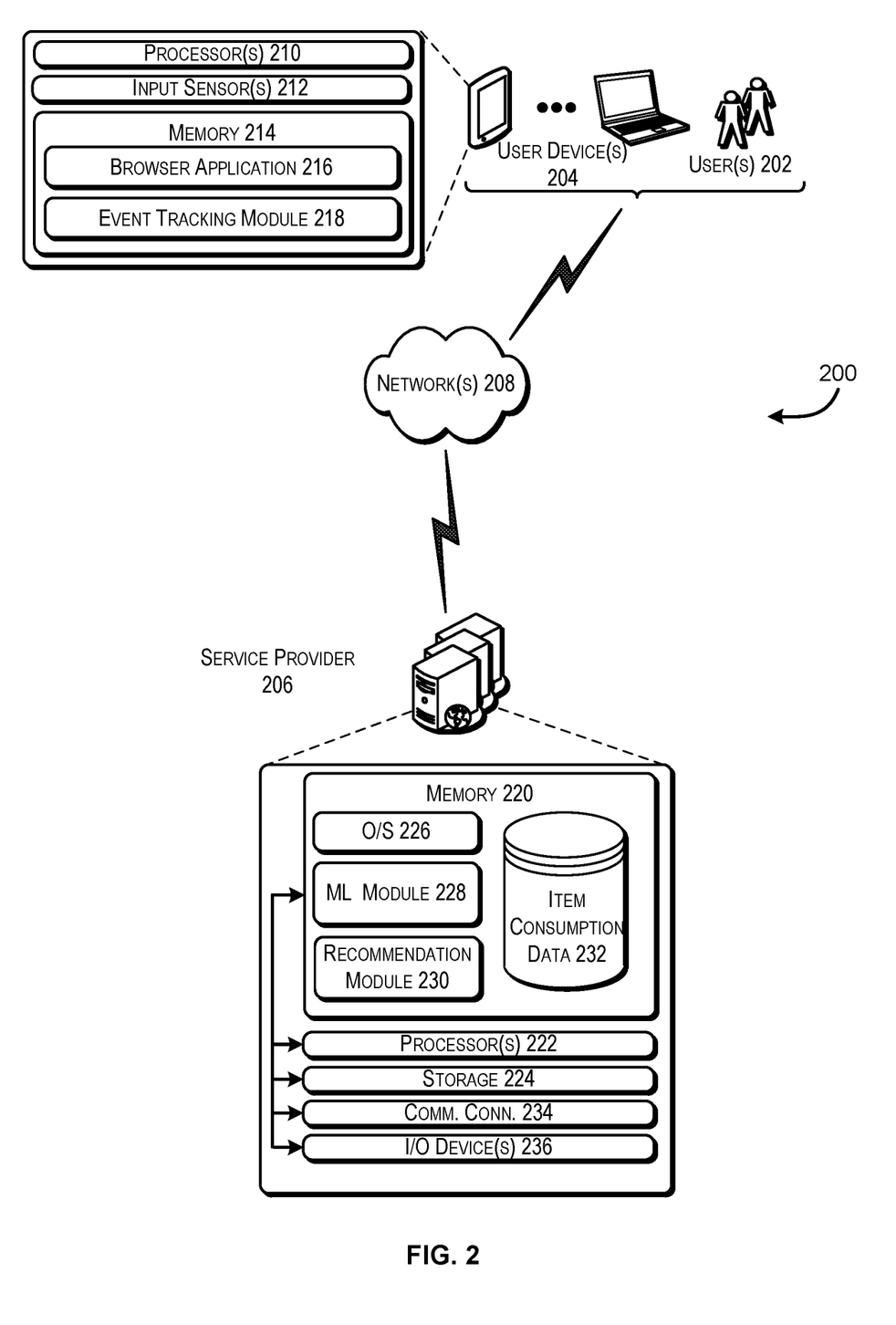
FIG. 2 depicts an illustrative example of a system or architecture in which techniques for providing improved may be implemented.

FIG. 2 depicts an illustrative example of a system or architecture 200 in which techniques for providing improved may be implemented. In architecture 200, one or more consumers and/or users 202 may utilize user devices 204. In some examples, the user devices 204 may be in communication with a service provider 206 via the network(s) 208, or via other network connections.

The user devices 204 may be any suitable type of computing device such as, but not limited to, a mobile phone, a smart phone, a personal digital assistant (PDA), a laptop computer, a desktop computer, a server computer, a thin-client device, a tablet PC, etc. Additionally, user devices 204 may be any suitable type of wearable technology device, such as a watch, earpiece, glasses, etc. The user device 204 may include one or more processors 210 capable of processing user input. The user device 204 may also include one or more input sensors 212 for receiving user input. As is known in the art, there are a variety of input sensors 212 capable of detecting user input, such as accelerometers, cameras, microphones, etc. The user input obtained by the input sensors may be from a variety of data input types, including, but not limited to, audio data, visual data, or biometric data. Embodiments of the application on the user device 204 may be stored and executed from its memory 214.

Turning to the contents of the memory 214 in more detail, the memory 214 may include a browser application 216. The memory 214 may also include an event tracking module 218 that is capable of detecting item consumption events on the user device 204 and reporting the item consumption events to the service provider 206. Although sample architecture 200 depicts an event tracking module 218 as being included in the contents of the memory 214 of the user device 204, some embodiments may not include an event tracking module 218 in memory 214 of the user device 204. In those embodiments in which the event tracking module 218 is not included in memory 214, input received by the input sensors 212 may instead be processed by the service provider 206. This will be described in detail below.

In some embodiments, the event tracking module 218 may be configured to, upon execution by the processors 210, cause the user device to track item consumption events. In some embodiments, the event tracking module 218 may monitor usage of a particular application or resource accessed via the user device 204. For example, the event tracking module 218 may monitor a user's reading habits as exhibited via an ebook application. In some embodiments, the event tracking module 218 may monitor a user's online interactions. For example, the event tracking module 218 may keep a record of websites visited by the user. In some embodiments, the event tracking module 218 may also be configured to provide detected item consumption events to the service provider 206. The detected item consumption events may be stored by the service provider 206 in association with the user.

In some examples, the network(s) 208 may include any one or a combination of many different types of networks, such as cable networks, the Internet, wireless networks, cellular networks, and other private and/or public networks. While the illustrated example represents the users 202 accessing the service provider 206 via browser application 216 over the network(s) 208, the described techniques may equally apply in instances where the users 202 interact with a service provider 206 via the user device 204 over a landline phone, via a kiosk, or in any other manner. It is also noted that the described techniques may apply in other client/server arrangements (e.g., set-top boxes, etc.), as well as in non-client/server arrangements (e.g., locally stored applications, peer to-peer systems, etc.).

As described briefly above, the browser application 216 may allow the users 202 to interact with a service provider 206, such as to store, access, and/or manage data, develop and/or deploy computer applications, and/or interact with web content. The one or more service providers 206, perhaps arranged in a cluster of servers or as a server farm, may be configured to host a website (or combination of websites) viewable via the user device 204 or a web browser accessible by a user device 204 via the browser application 216. Although depicted in memory of the user device 204 in this example, in some embodiments the browser application 216 may be hosted at a server. For example, the user device 204 may be a thin client device capable of accessing a browser application 216 remotely. The browser application 216 may be capable of handling requests from many users 202 and serving, in response, various user interfaces that can be rendered at the user device 204 such as, but not limited to, a web site. The browser application 216 may be any suitable type of application or interface that supports user interaction with a website, including those with user interaction, such as social networking sites, electronic retailers, informational sites, blog sites, search engine sites, news and entertainment sites, and so forth. As discussed above, the described techniques can similarly be implemented outside of the browser application 216, such as with other applications running on the user device 204.

The service provider 206 may be any suitable type of computing device such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the service provider 206 may be executed by one more virtual machines implemented in a hosted computing environment. The hosted computing environment may include one or more rapidly provisioned and released computing resources, which computing resources may include computing, networking, and/or storage devices. A hosted computing environment may also be referred to as a cloud-computing environment.

In one illustrative configuration, the service provider 206 may include at least one memory 220 and one or more processing units (or processor(s)) 222. The processor(s) 222 may be implemented as appropriate in hardware, computer-executable instructions, firmware or combinations thereof. Computer-executable instruction or firmware implementations of the processor(s) 222 may include computer-executable or machine executable instructions written in any suitable programming language to perform the various functions described.

The memory 220 may store program instructions that are loadable and executable on the processor(s) 222, as well as data generated during the execution of these programs. Depending on the configuration and type of service provider 206, the memory 220 may be volatile (such as random access memory (RAM)) and/or non-volatile (such as read-only memory (ROM), flash memory, etc.). The service provider 206 may also include additional storage 224, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 220 may include multiple different types of memory, such as static random access memory (SRAM), dynamic random access memory (DRAM) or ROM. Turning to the contents of the memory 220 in more detail, the memory 220 may include an operating system 226 and one or more application programs or services for implementing the features disclosed herein including at least a module for generating a prediction model (machine learning (ML) module 228) and/or a module for predicting a future item consumption event (recommendation module 230). The memory 220 may also include item consumption data 232, which comprises historical item consumption events for a plurality of users. In some embodiments, the item consumption data 232 may be stored in a database.

The memory 220 and the additional storage 224, both removable and non-removable, are examples of computer-readable storage media. For example, computer-readable storage media may include volatile or non-volatile, removable or non-removable media implemented in any method or technology for storage of information such as computer-readable instructions, data structures, program modules or other data. As used herein, modules may refer to programming modules executed by computing systems (e.g., processors) that are part of the user device 204 or the service provider 206. The service provider 206 may also contain communications connection(s) 234 that allow the service provider 206 to communicate with a stored database, another computing device or server, user terminals, and/or other devices on the network(s) 208. The service provider 206 may also include input/output (I/O) device(s) and/or ports 236, such as for enabling connection with a keyboard, a mouse, a pen, a voice input device, a touch input device, a display, speakers, a printer, etc.

Turning to the contents of the memory 220 in more detail, the memory 220 may include an operating system 226, a database containing item consumption data 232 and the one or more application programs or services for implementing the features disclosed herein, including a machine learning module 228 and/or a recommendation module 230.

In some embodiments, the machine learning module 228 may be configured to, upon execution by the processors 222, cause the service provider 206 to generate a prediction model that may be used to predict future item consumption events. In some embodiments, the machine learning module 228 may identify patterns within item consumption data 232 and may generate a prediction model based on those patterns that, when provided a set of user-specific item consumption events, extrapolates an item consumption prediction for that user. There are a number of known techniques that may be used in machine learning. For example, the machine learning module 228 may utilize neural network learning, decision tree learning, association rule learning, deep learning, reinforcement learning, or any other suitable machine learning technique. In some embodiments, the machine learning module 228 may use inputs and outputs comprising item consumption events from the item consumption data 232. In some embodiments, item consumption events in the inputs and outputs may overlap. In some embodiments, item consumption events include in the inputs and/or outputs may be altered or otherwise adjusted in accordance with techniques described elsewhere in this disclosure.

In some embodiments, the recommendation module 230 may be configured to, upon execution by the processors 222, cause the service provider 206 to utilize a prediction model generated by the machine learning module 228 to make a prediction about future item consumption events. In some embodiments, the recommendation module 230 may receive, as input, item consumption events associated with a particular user (e.g., item purchases made by that user). In some embodiments, the recommendation module may apply the prediction model generated by the machine learning technique to the received item consumption events. In some embodiments, the recommendation module may initiate the machine learning module 228 in order to generate an item consumption event prediction based on the received item consumption events.

Item consumption data 232 may be predetermined or it may be dynamically generated. For example, the item consumption data 232 may be continuously updated to include information related to new item consumption events as those item consumption events occur. The machine learning module 228 may be configured to execute on a periodic basis to generate a new prediction model from the updated item consumption data 232. For example, the machine learning module may generate a new prediction model on an hourly, daily, weekly, or monthly basis. In some embodiments, the machine learning module 228 may adjust the prediction model as new item consumption events are added to the item consumption data 232.

Figure 3:
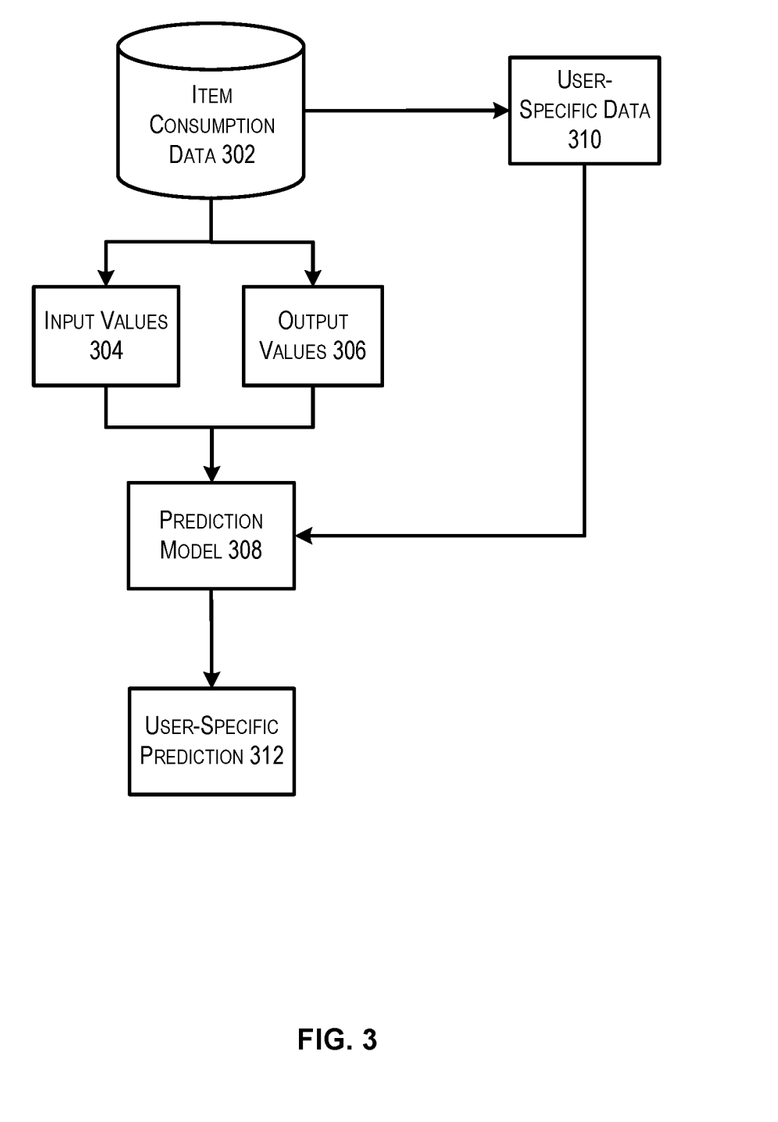
FIG. 3 depicts an example data flow that may be implemented using the described architecture in accordance with at least some embodiments.

FIG. 3 depicts an example data flow that may be implemented using the described architecture in accordance with at least some embodiments. In FIG. 3, item consumption data 302 is used to generate a set of input values 304 and/or a set of output values 306. As depicted by the arrows values may be queried from the item consumption data 302 to generate each of the input values 304 and output values 306 based on specified conditions (e.g., a data split). For example, input values 304 may be generated by querying all item consumption events occurring before a predetermined date. In this example, the output values 306 may be generated by querying all item consumption events occurring after that date. Item consumption data 302 may be an example of item consumption data 232 of FIG. 2. The set of input values 304 and/or output values 306 may be used to generate a prediction model 308.

In some embodiments, the set of input values 304 may comprise item consumption events that fall within a predetermined category or meet a specified condition. This category or condition may be referred to as a data split. For example, the set of input values may include item consumption events occurring before a predetermined date. In another example, the set of input values may include item consumption events of a particular type or category (e.g., consumption events related to electronic books). In some embodiments, the set of input values may be formatted as a matrix/vector, or a set of matrices/vectors. In some embodiments, a data split may comprise a feature threshold such that set of input values 304 may comprise item consumption events in which the associated item exhibits a particular feature.

In some embodiments, the set of output values 306 may comprise item consumption events that fall within a second predetermined category. The set of output values may or may not overlap with the set of input values. For example, in some cases the set of input values may include item consumption events before a predetermined date and the set of output values may include item consumption events after that date. In another example, the set of input values may include item consumption events before a predetermined date and the set of output value may include item consumption events regardless of date, but wherein the item consumption events are weighted according to a time-decay function (e.g., a function that assigns a higher value to more recent item consumption events).

As depicted by the arrow, a prediction model 308 may be generated from the set of input values 304 and the set of output values 306 using various machine learning techniques. In one example embodiment, an artificial neural network machine learning technique may be used to generate the prediction model 308. Using this technique, the set of inputs 304 may be used as an input layer and the set of outputs may be used as an output layer. In this technique, the input layer may be connected to the output layer via one or more hidden layers. The generated prediction model 308 may include a number of connections between the hidden layers and the input layer and/or output layer, each of which may be assigned a numeric weight generated based on a pattern identified between the set of input values 304 and the set of output values 306. This technique is described in greater detail with respect to FIG. 4 below.

Once a prediction model 308 has been generated, it may be used to predict one or more future item consumption events. For example, as depicted by the arrow from the item consumption data 302 to the user-specific data 310, user-specific data 310 (e.g., item consumption events associated with a particular user) may be retrieved from the item consumption data 302. The user-specific data 310 may then be input to the prediction model 308 to output a user-specific prediction 312. The user-specific predictions 312 may include one or more item consumption events that the user is predicted to initiate based on the user-specific data 310. In some embodiments, the user-specific predictions 312 may be presented to the user.

Figure 4:
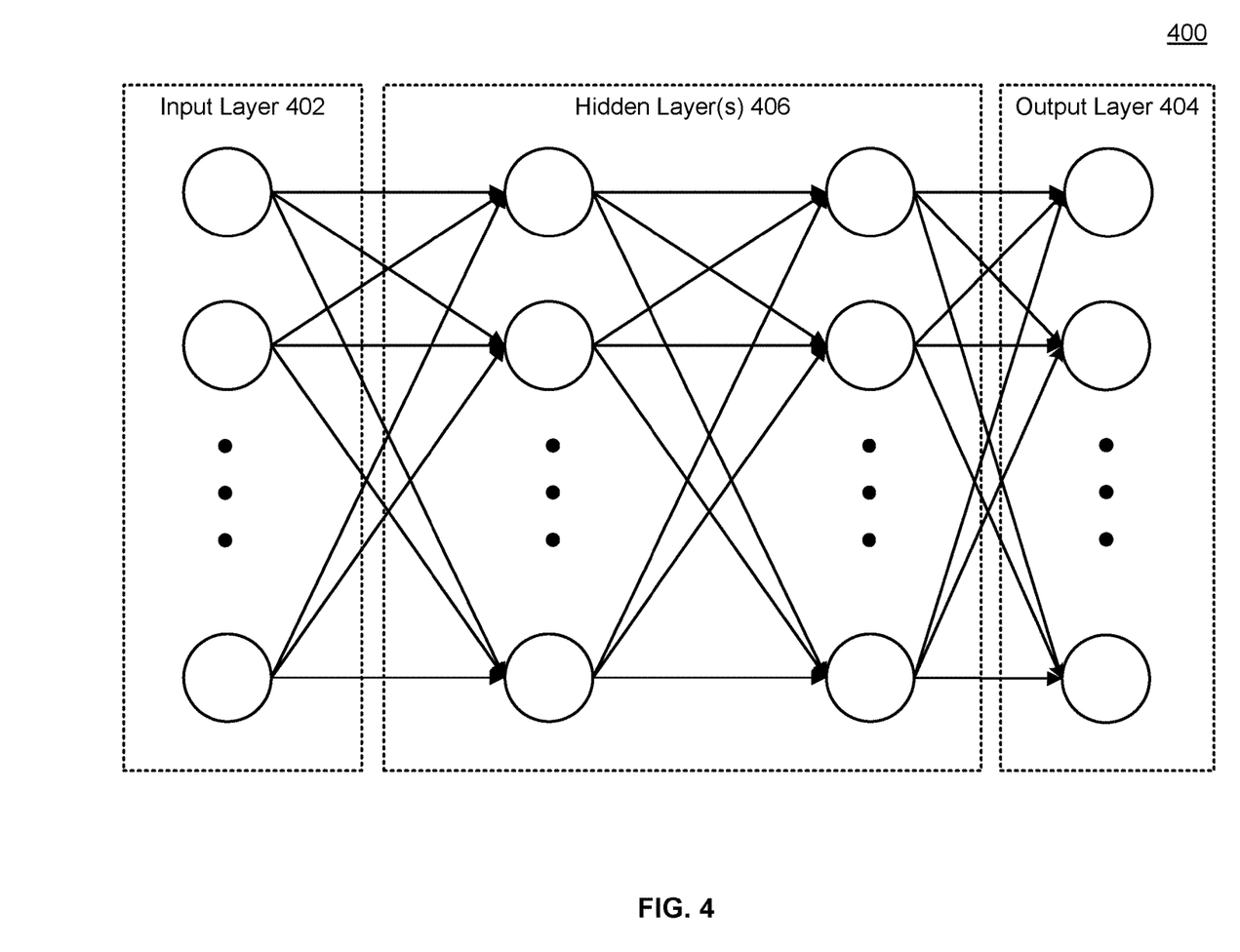
FIG. 4 illustrates an example artificial neural network in accordance with at least some embodiments.

FIG. 4 illustrates an example artificial neural network 400 in accordance with at least some embodiments. A recommendation system may implement embodiments of the neural network 400 as a prediction model to provide item consumption event predictions.

Generally, an artificial neural network 400 represents a network of interconnected nodes, similar to a biological neural network, where knowledge about the nodes is shared across output nodes and knowledge specific to each output node is retained. Each node represents a piece of information. Knowledge can be exchanged through node-to-node interconnections and node-to-task connections. Input to the artificial neural network 400 activates a set of nodes. In turn, this set of node activates other nodes, thereby propagating knowledge about the input. At each set of nodes, transformative functions may be applied to the data. This activation process is repeated across other nodes until an output node is selected and activated.

As illustrated, the artificial neural network 400 includes a series of layers, each representing a set of nodes. On one side of the series of layers exists an input layer 402. The input layer 402 includes a set of nodes that are referred to herein as input nodes. Each of these input nodes may be mapped to a particular item consumption event.

On the other side of the series of layers is an output layer 404. The output layer 404 includes a number of output nodes. Each of the output nodes is mapped to another item consumption event. In some embodiments, a value associated with the output node may be weighted according to an amount of time that has elapsed since the occurrence of the item consumption event associated with the output node.

One or more hidden layers 406 separates the input layer 402 and the output layer 404. The hidden layers 406 includes "N" number of hidden layers, where "N" is an integer greater than or equal to one. In turn, each of the hidden layers also includes a set of nodes that are referred to herein as hidden nodes.

On one side of the hidden layers 406, hidden nodes are interconnected to the input nodes. Each of the input nodes may be connected to each of the hidden nodes of the hidden layer connected to the input layer 402. On the other side of the hidden layer 406, hidden nodes are connected to the output nodes. Each of the output nodes may be connected to each of the hidden nodes of the hidden layer connected to the output layer 404. In other words, each input node connects to each hidden node in the hidden layer closest to the input layer 402 and each output node connects to each hidden node in the hidden layer closest to the output layer 404. The input nodes are not directly interconnected to the output nodes. If multiple hidden layers exist, the input nodes are interconnected to hidden nodes of the closest hidden layer only. In turn, these hidden nodes are interconnected to the hidden nodes of the next hidden layer and so on and so forth.

An interconnection may represent a piece of information learned about the two interconnected nodes. In comparison a connection between a hidden node and an output node may represent a piece of information learned that is specific to the output node. The interconnection may be assigned a numeric weight that can be tuned (e.g., based on a training dataset), rendering the artificial neural network 400 adaptive to inputs and capable of learning.

Generally, the hidden layer 406 allows knowledge about the input nodes of the input layer 402 to be shared amongst the output nodes of the output layer 404. To do so, an activation function $f$ is applied to the input nodes through the hidden layer 406. In an example, the activation function $f$ may be non-linear. Different non-linear activation functions $f$ are available including, for instance, a rectifier function $f(x)=\max(0, x)$. In an example, a particular non-linear activation function $f$ is selected based on cross-validation. For example, given known example pairs (x, y), where x∈X and y∈Y, a function $f: X \rightarrow Y$ is selected when such a function results in the best matches (e.g., the best representations of actual correlation data).

The artificial neural network 400 may also use a cost function to find an optimal solution (e.g., an optimal activation function). The optimal solution represents the situation where no solution has a cost less than the cost of the optimal solution. In an example, the cost function includes a mean-squared error function that minimizes the average squared error between an output $f(x)$ and a target value y over the example pairs (x, y). In some embodiments, a backpropagation algorithm that uses gradient descent to minimize the cost function may be used to train the artificial neural network 400. In some embodiments, the artificial neural network 400 may be an autoencoder neural network, in which both inputs and outputs are provided to the artificial neural network during training and the autoencoder learns to reconstruct its inputs.

In the depicted artificial neural network 400, a prediction model may be generated such that the hidden layer 406 retains information (e.g., specific variable values and/or transformative functions) for a set of input values and output values used to train the artificial neural network 400. This retained information may be applied to a set of user-specific input values in order to determine likely output values. In some embodiments, the artificial neural network 400 may be trained on item consumption events for a large number of users so that it may be used to predict future item consumption events for a single user. For example, an artificial neural network 400 may be used to generate a prediction model using inputs that include item consumption events from a plurality of users that occurred before a specified date and outputs that include item consumption events from the plurality of users that occurred after that date (as well as weighted item consumption events occurring before the date). In this example, the resulting prediction model may be applied to a user's past item consumption events to predict the user's likely future item consumption events. In another example, an artificial neural network 400 may be used to generate a prediction model using inputs that include item consumption events from a first category of item and outputs that include item consumption events from a second category of item. In this example, the resulting prediction model may be applied to a user's item consumption events in the first category of items to determine the user's likely interests in the second category of items. By way of illustration, the prediction model may be trained using item consumption events related to books as input values and item consumption events related to movies as output values. In this illustration, a user's movie preferences may be ascertained by applying the prediction model to the user's book consumption.

Figure 5A:
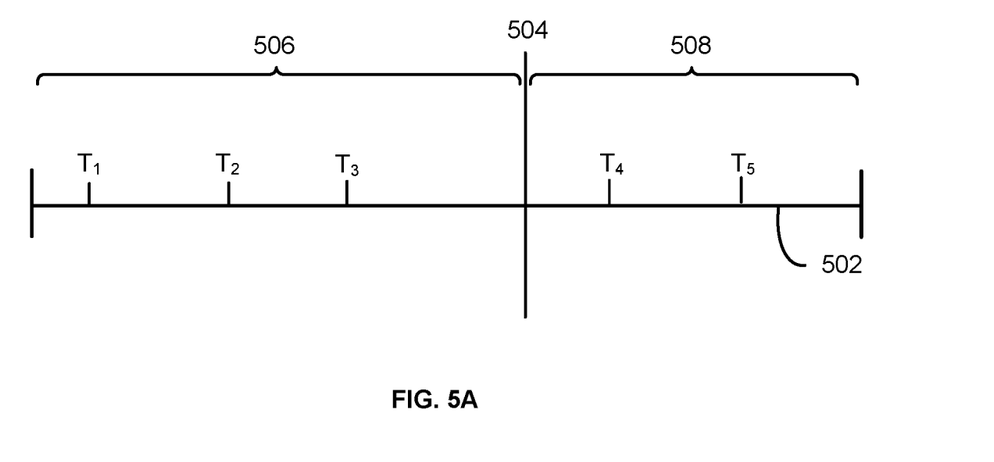
FIG. 5A depicts an example in which a set of inputs and a set of outputs is generated which is mutually exclusive based on a date threshold.
Figure 5B:
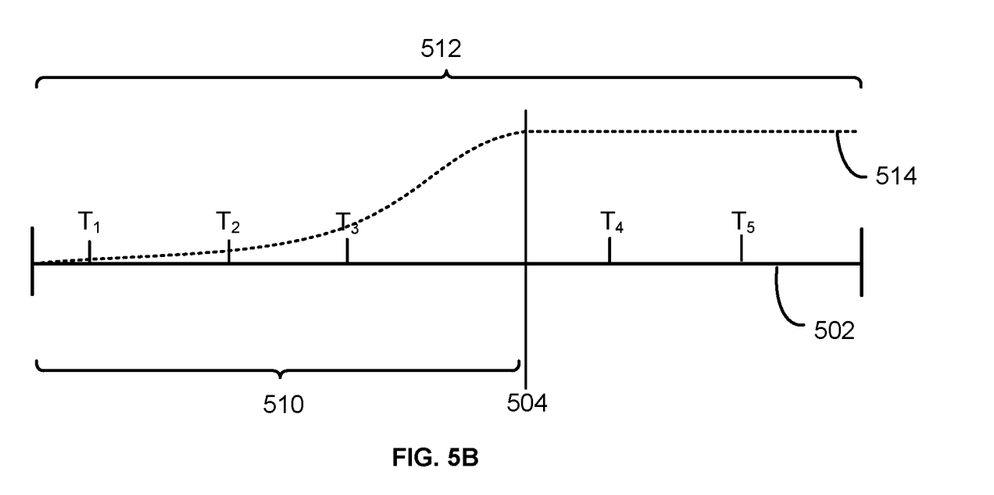
FIG. 5B depicts an example in which a set of inputs and a set of outputs is generated which includes overlapping data subject to a time-decay function.

FIG. 5 depicts examples of a timelines and data splits that may be used in generating a set of inputs and a set of outputs to be used in machine learning techniques in accordance with some embodiments of the disclosure. A first example is depicted with respect to FIG. 5A, in which a set of inputs and a set of outputs is generated which is mutually exclusive based on a date threshold. A second example is depicted with respect to FIG. 5B, in which a set of inputs and a set of outputs is generated which includes overlapping data subject to a time-decay function.

Both FIG. 5A and FIG. 5B include a timeline 502 with a data split 504. The timeline 502 in these figures represents an interval of time to which item consumption events may be mapped. The data split 504 in these figures represents a date threshold. In some embodiments, the date threshold may be a predetermined point in time. In some embodiments, the date threshold may be a specific amount of time into the past. For example, the data split may represent a date that is one week ago from the present.

In FIG. 5A, a set of inputs may include item consumption events 506 occurring on one side of the data split 504. For example, the set of inputs in the illustrated example may include item consumption events $T_1$, $T_2$, and $T_3$. Although only a few item consumption events are depicted as occurring over the timeline 502, it should be recognized that a typical set of inputs might include a multitude of item consumption events conducted by a number of different users. The set of inputs may be used as input training data for one or more machine learning techniques.

A set of outputs for this example may include item consumption events 508 occurring on the other side of the data split 504. For example, the set of inputs in the illustrated example may include item consumption events $T_4$ and $T_5$. Similar to the set of inputs, it should be recognized that a typical set of outputs might include a multitude of item consumption events conducted by a number of different users. The resulting set of outputs may be used as output training data for one or more machine learning techniques.

This example illustrates an embodiment that uses a hard data split. For the purposes of this disclosure, an embodiment that uses a hard data split may refer to an embodiment in which the cost function used to generate a prediction model includes mutually exclusive data sets (e.g., the set of inputs and set of outputs has no overlap). By generating a set of inputs from item consumption events 506 and a set of outputs from item consumption events 508 in this manner, a prediction model may be generated that correlates item consumption events 506 to item consumption events 508. This results in a prediction model that may map a user's specific item consumption events to one or more of the item consumption events 508.

In some example embodiments, a standard cost function used for a hard data split may be defined by:

$$y_{i,n} * \log(yp_{i,n}) + (1 - y_{i,n}) * \log(1 - yp_{i,n})$$

In this cost function, $y_{i,n}$ is an indicator of consumption of item i by user n in the output set (e.g., a set of outputs indicates a consumption of this item). Additionally, $yp_{i,n}$ is a predicted probability of consumption of item i by user n, which may defined by function:

$$f_2(w_2 * f_1(w_1 * x_{i,n}))$$

In this predicted probability function, $f_2(\ )$, and $f_1(\ )$ are activation functions (e.g., these may be sigmoid functions, relu functions, tanh functions, etc.), $x_{i,n}$ is an indicator of consumption of item i by user n in the input set (e.g., a set of inputs indicates a consumption of this item), and $w_1$ and $w_2$ each represent weights that may be applied.

In embodiments that utilize a hard data split, this results in a recommendation for an item consumption event that is popular after the date threshold. For example, if the date threshold includes the last week, then only those item consumption events from the last week will be included in the output set. This means that only those item consumption events from the last week might be recommended by a subsequent recommendation system. Although this results in a recommendation for item consumption events that are popular at the time of the split, the output data may be more sparse than a service provider that uses the recommendation system would prefer. For example, the service provider may be an electronic retailer that maintains a large electronic catalog. In this example, the service provider may want to provide recommendations for less popular items as well as those items that are popular at the time of the split.

In FIG. 5B, a set of inputs may include item consumption events 510 occurring on one side of the data split 504. For example, similar to the example above, the set of inputs in the illustrated example may include item consumption events $T_1$, $T_2$, and $T_3$. In some embodiments, the set of inputs may be subjected to a time-decay function. For example, each indication of an item consumption event in the set of inputs may be weighted proportionally based on an amount of time that has elapsed since the item consumption event. The set of inputs may be used as input training data for one or more machine learning techniques.

A set of outputs for this example may include item consumption events 512 occurring on the other side of the data split 504 as well as at least some item consumption events occurring before the data split 504 subject to a time-decay function 514. For example, the set of outputs in the illustrated example may include item consumption events $T_4$ and $T_5$ as well as $f(T_1)*T_1$, $f(T_2)*T_2$, and $f(T_3)*T_3$, where $f(\ )$ is a time-decay function 514 with respect to a time at which the respective item consumption event occurred. Similar to the set of inputs, it should be recognized that a typical set of outputs might include a multitude of item consumption events conducted by a number of different users. The resulting set of outputs may be used as output training data for one or more machine learning techniques.

In some embodiments, (e.g., autoencoder artificial neural networks) the artificial neural network trains a prediction model to reconstruct a set of outputs given a set of inputs. In some embodiments, the number of output nodes may need to match the number of input nodes. In that case, a set of inputs may include a number N of item consumption events from a first side of the data split. The set of outputs may include each of the item consumption events from a second side of the data split M and a number of the most recent item consumption events from the first side of the data split N-M adjusted using a time-decay function. By generating sets of inputs and outputs in this manner, both sets will include N total item consumption events.

In some embodiments, (e.g., predictive artificial neural networks) the artificial neural network may be a predictive model in which a set of inputs are used to predict a set of outputs. In these embodiments, the prediction model may be trained using backpropagation. In some embodiments, an artificial neural network of the described system may comprise elements of both an autoencoder artificial neural network and a predictive artificial neural network.

This example illustrates an embodiment that uses a soft data split. For the purposes of this disclosure, an embodiment that uses a soft data split may refer to an embodiment in which the cost function used to generate a prediction model includes a set of outputs that overlaps at least partially with the set of inputs. By generating a set of inputs from item consumption events 510 and a set of outputs from item consumption events 512 in this manner, a prediction model may be generated that correlates item consumption events 510 to item consumption events 512. This results in a prediction model that may map a user's specific item consumption events to a broad range of item consumption events.

In some example embodiments, an example cost function used for a soft data split may be defined by:

$$yw_i * ywc_{i,n} * y_{i,n} * \log(yp_{i,n}) + w_0 * (1 - y_{i,n}) * \log(1 - yp_{i,n})$$

In this cost function, $y_{i,n}$ is an indicator of consumption of item i by user n in a set of outputs (e.g., a set of outputs indicates a consumption of this item). Similar to the cost function used for hard data splits, $yp_{i,n}$ is a predicted probability of consumption of item i by user n. Additionally, $ywc_{i,n}$ is a weight of item i for user n as determined by a time-decay function 514. Some cost functions may include $yw_i$, which represents a weight of item i based on a popularity of that item. Additionally, some cost functions may include $w_0$, which represents a weight applied during training for items which were not consumed (i.e., it controls the imbalance between number of item consumption events selected and total number of item consumption events predicted). Different embodiments of a cost function using a soft data split may include some or all of the elements of the cost function presented above.

As illustrated, $ywc_{i,n}$ is a weight of item i for user n as determined by a time-decay function 514. A time-decay function generates a weight to be applied to an item consumption event based on an amount of time that has elapsed since the item consumption event. A time decay-function 514 may comprise any suitable number of functions in which an item consumption event will be given a greater weight the more recently it occurred. For example, a time-decay function may be a linear function, a polynomial function, an exponential function, a logarithmic function, or any other suitable function. In some embodiments, the time-decay function 514 may be used to weight some of the item consumption events included in an output set (e.g., those occurring before a date threshold). In some embodiments, the time-decay function 514 may be used to weight the item consumption events included in an output set. Additionally, in some embodiments of the disclosure, item consumption events in a set of inputs may also be weighted according to a time-decay function. The time-decay function applied to the set of inputs may be different than the time-decay function applied to the set of outputs.

As illustrated, the cost function may include a weight of item i based on a popularity of that item ($yw_i$). For example, the weight may be inversely proportional to a popularity of the item in order to prevent the prediction model from simply recommending only popular items (e.g., more popular items will be given less weight). Since consumption of popular items are more likely to be correlated to other item consumption events, item consumption events related to popular items are more likely to be predicted by a prediction model regardless of whether they are relevant. The addition of weight $yw_i$ effectively lessens the extent to which item consumption events related to that popular item will be predicted.

As illustrated, some cost functions may include $w_0$, which represents a weight applied during training for items which were not consumed (e.g., item consumption events that were predicted but not consumed by a user). This biasing of actual item consumptions versus non-consumptions during training of a prediction model may be referred to as a delta-boost technique. The purpose of this delta-boost is to focus the training of the neural network on positive outcomes, allowing the neural network to learn more quickly in high dimensional and sparse datasets. For example, selected item consumption events may be biased at 100 times those of non-selected item consumption events. By way of illustration, a prediction model may be used to predict several item consumption events for a particular user based on a set of input item consumption events occurring before a particular date. The predictions may be compared to actual item consumption events selected after that date and a weight $w_0$ may be adjusted in association with the item consumption event in the prediction model based on whether or not it was selected. In some embodiments, the weight may represent a number between 1 and 100, where 100.

Item consumption events included in either a set of inputs 510 and/or a set of outputs 512 may be weighted according to a number of additional factors. In some embodiments, item consumption events may be weighted based on item features and/or user features. In one illustrative example, item consumption events may be weighted according to an item's cost. In this example, a recommendation system may grant higher weight to more expensive items to provide more predictions for higher cost items. The recommendation system may also grant higher weight to less expensive items to provide more predictions for lower cost items. As a practical example, the recommendation system may generate two or more prediction models: one of which is weighted toward more expensive items and one of which is weighted toward less expensive items. The prediction model used to provide a predicted item consumption event for a particular user may then be selected based on that user's income. For example, if the user's income is above a threshold value, then the prediction model weighted toward more expensive items may be used to generate a prediction for that user. Otherwise, the prediction model weighted toward less expensive items may be used to generate a prediction for that user.

Figure 6:
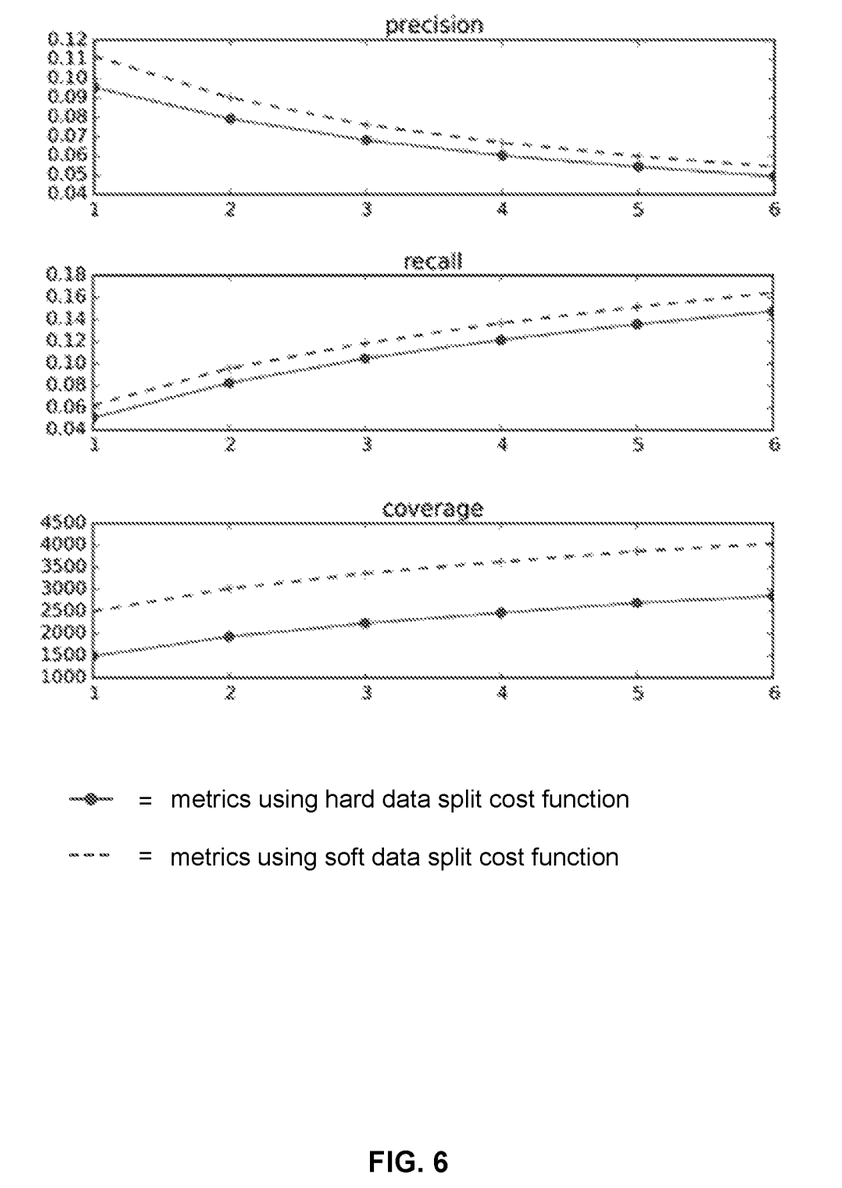
FIG. 6 depicts example technical advantages that may be achieved in accordance with embodiments of the disclosure as represented by increases in certain accuracy metrics.

FIG. 6 depicts some technical advantages that may be achieved using embodiments of the disclosure as represented by increases in certain accuracy metrics. The depicted graphical results illustrate actual accuracy metrics achieved using implementations of some of the described embodiments of the disclosure.

With respect to recommendation systems, the term "precision" may refer to a proportion of the top X item consumption events that are relevant (e.g., item consumption events that belong to an appropriate item consumption event category), where X is some predicted number of item consumption events. For example, precision may refer to the number of relevant item consumption events returned divided by the total number of item consumption events returned.

With respect to recommendation systems, the term "recall" may refer to a proportion of total relevant item consumption events returned. For example, recall may refer to the number of relevant item consumption events returned divided by the total number of relevant item consumption events available.

With respect to recommendation systems, the term "coverage" may refer to a number and/or variety of item consumption events that may be provided as a result of the prediction model. In an autoencoder system, coverage is often limited by the number and/or variety of item consumption events included in the set of output values used to train the prediction model.

The graphical results depicted represent actual results obtained by running test scenarios on user data maintained by an electronic retailer on a large number of users. In each of the depicted graphical results, the x-axis represents a number of item consumption events provided to generate a prediction. As depicted by the graphical results, the use of a soft data split to improve an artificial neural network prediction model resulted in increases to each of precision, recall, and coverage in a recommendation system that used that prediction model. Accordingly, embodiments of the disclosure provide for more accurate predictions than typical recommendation systems as well as a wider variety of recommendations. This type of recommendation system is preferable to service providers which wish to provide visibility for a larger number of items consumption events.

Figure 7:
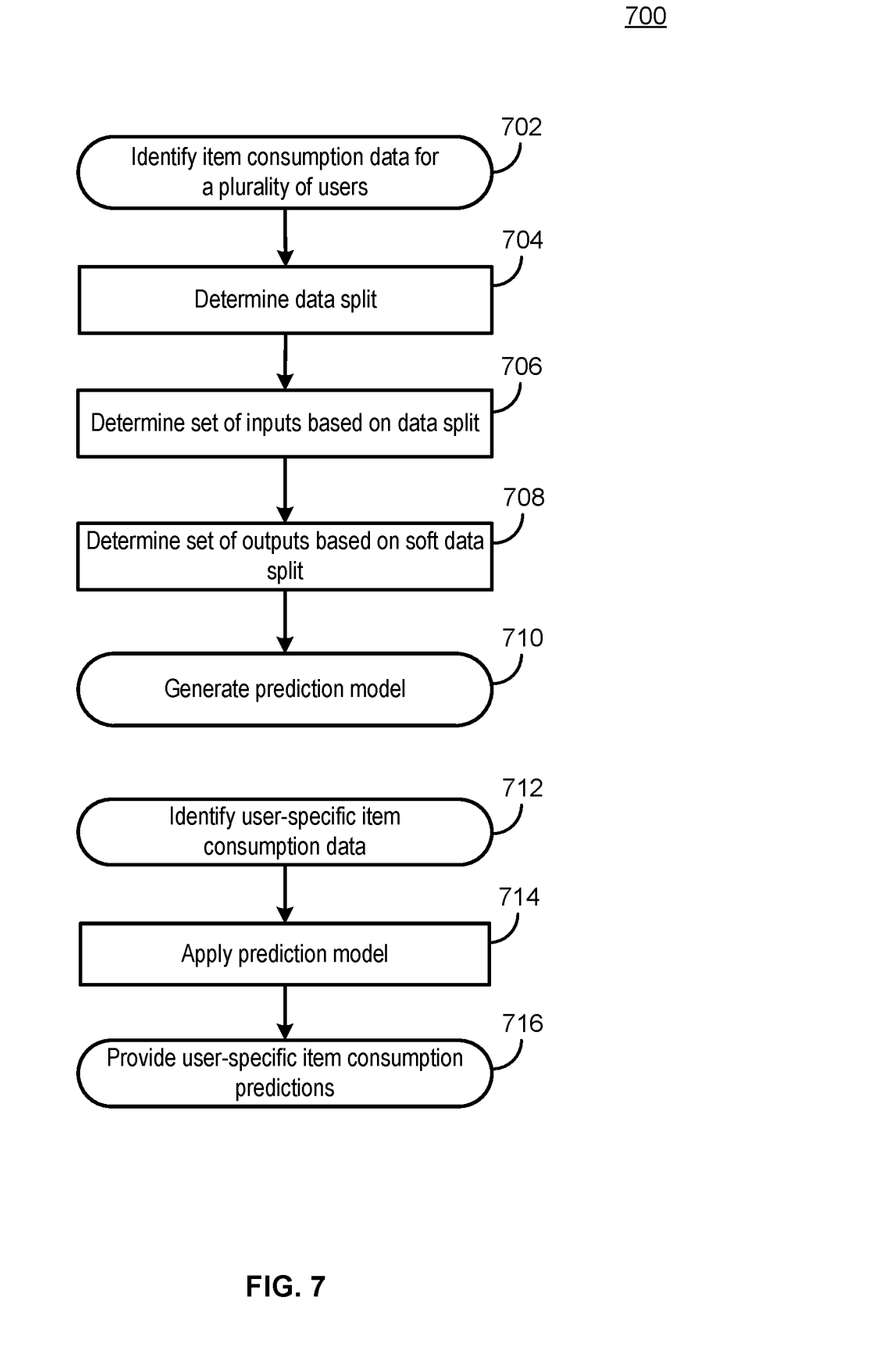
FIG. 7 depicts an example process for providing user-specific item consumption event predictions in accordance with at least some embodiments of the disclosure.

FIG. 7 depicts a process for providing user-specific item consumption event predictions in accordance with at least some embodiments of the disclosure. Some or all of the process 700 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. For example, the process 700 may be performed by the service provider 206 of FIG. 2. The code may be stored on a computer-readable storage medium, for example, in the form of a computer program comprising a plurality of instructions executable by one or more processors. The computer-readable storage medium may be non-transitory.

Process 700 may begin at 702, when item consumption data is identified for a plurality of users. For example, in some embodiments, the plurality of users may be users of an electronic marketplace and item consumption events may comprise purchase transactions for a number of items provided by the electronic marketplace. In this example, historical item purchase data may be used to train a prediction model using one or more machine learning techniques.

At 704, the process may comprise determining a data split to be used in identifying a set of input values and/or a set of output values. In some embodiments, the data split may be a date threshold. A date threshold may be a set date (e.g., Jan. 1, 2016), a floating date (e.g., the date exactly one week prior), or any other suitable type of date threshold. In some embodiments, the data split may be a difference in item category or type. For example, item consumption events of a first type may be included in a set of input values and item consumption events of a second type may be included in a set of output values such that a user's interactions with the first type of item may be used to predict the user's preference with respect to the second type of item.

At 706, the process may comprise determining a set of input values based on the data split. In some embodiments, all item consumption events on one side of the data split (e.g., occurring before a date threshold) may be included in an input set. In some embodiments, a time-decay function may be used to weight item consumption events within the set of inputs. For example, item consumption events that have occurred more recently may be given greater weight than item consumption events that occurred further in the past. In some events, only item consumption events that have occurred within a predetermined period of time may be included in a set of inputs.

At 708, the process may comprise determining a set of outputs based on the data split. In some embodiments, the set of outputs may be determined based on a soft data split. For example, the set of outputs may include item consumption events on one side of a data split (e.g., occurring after a date threshold) as well as at least some item consumption events occurring on the other side of the data split weighted according to a time-decay function. In other words, the output may include at least some of the item consumption events that are also included in the set of inputs weighted in proportion to an amount of time that has elapsed since the occurrence of that item consumption event. In some embodiments, the set of outputs may include of the item consumption events, each of which is weighted according to a time-decay function.

At 710, a prediction model may be generated based on the determined set of input value and the determined set of output values. In some embodiments, the set of inputs and the set of outputs may be used to train a machine learning technique. For example, the set of inputs and the set of outputs may be input to an autoencoder neural network machine, which will then attempt to learn patterns and/or correlations between each of the inputs and each of the outputs using one or more cost functions. The cost functions may include one or more of the weights and/or elements described herein (e.g., those described with respect to FIG. 5 above).

At 712, user-specific item consumption data may be identified. For example, a request may be received to provide one or more item consumption event predictions associated with a particular user. In this example, information on user-specific item consumption events may be queried from a datastore. In some embodiments, user-specific item consumption event information may be stored in association with a user account maintained at a service provider computer.

At 714, the generated prediction model may be applied to the user-specific item consumption data to generate user-specific item consumption predictions. For example, information related to user-specific item consumption events may be included in a second set of inputs. The second set of inputs may then be provided to the generated prediction model to identify a set of output item consumption events. These output item consumption events are likely to be item consumption events that the user is interested in (e.g., likely to conduct).

At 716, user-specific item consumption predictions may be provided to a requesting entity. In some embodiments, the user-specific item consumption predictions may be provided to another module or application. For example, the item consumption predictions may be used by a targeted advertisement provider to provide advertisements to that user that are likely to be effective. In another example, the item consumption predictions may be used within an electronic marketplace to recommend products to the user that he or she is likely to be interested in.

Figure 8:
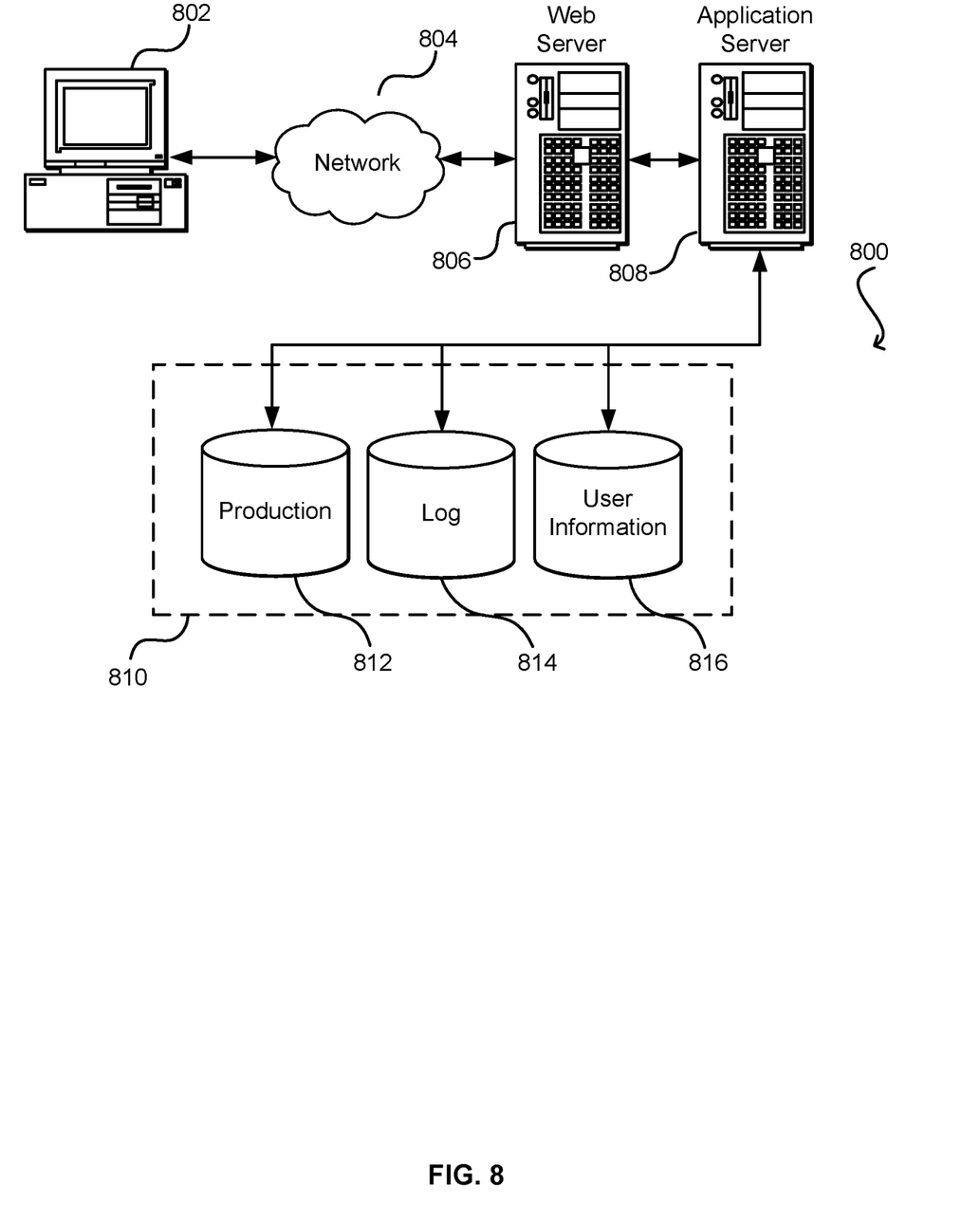
FIG. 8 illustrates an environment in which various embodiments can be implemented.

FIG. 8 illustrates aspects of an example environment 800 for implementing aspects in accordance with various embodiments. As will be appreciated, although a Web-based environment is used for purposes of explanation, different environments may be used, as appropriate, to implement various embodiments. The environment includes an electronic client device 802, which can include any appropriate device operable to send and receive requests, messages, or information over an appropriate network 804 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers, or other elements, processes, or components, which may be chained or otherwise configured, which can interact to perform output nodes such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of requests and responses, as well as the delivery of content between the client device 802 and the application server 808, can be handled by the Web server. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing production data 812 and user information 816, which can be used to serve content for the production side. The data store also is shown to include a mechanism for storing log data 814, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk®. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C #, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    identifying item consumption data for a plurality of users, the item consumption data including a record of past item consumption events for individual users in the plurality of users;
    creating a prediction model with the item consumption data at least in part by:
        determining a data split to be used in determining a set of inputs and a set of outputs;
        determining a set of inputs from the item consumption data based on the data split;
        determining a set of outputs from the item consumption data based on the data split, a portion of the set of outputs corresponding to a subset of the set of inputs; and
        training the prediction model, wherein training the prediction model includes at least:
            (1) involves determining a cost function based at least in part on a time-decay function applied to the portion of the set of outputs;
            (2) utilizing the determined set of inputs to predict the determined set of outputs; and
            (3) minimizing an error associated with the cost function based at least in part on the utilizing;
    receiving user-specific item consumption data; and
    generating, based at least in part on the prediction model and the user-specific item consumption data, a user-specific item recommendation.

2. The computer-implemented method of claim 1, wherein the data split is a date threshold.

3. The computer-implemented method of claim 1, wherein training the prediction model based on the determined set of inputs and the determined set of outputs comprises using at least one machine learning technique.

4. The computer-implemented method of claim 3, wherein the at least one machine learning technique comprises an artificial neural network.

5. The computer-implemented method of claim 4, wherein the artificial neural network is an autoencoder neural network.

6. A system comprising:
    a processor; and
    a memory including instructions that, when executed with the processor, cause the system to, at least:
        determine a set of past item consumption events;
        identify a first subset of the set of past item consumption events to be used as input values;
        identify a second subset of the set of past item consumption events to be used as output values, the second subset including a portion that overlaps with the first subset;
        train a prediction model, wherein training the prediction model includes at least:

(1) involves determining a cost function based at least in part on a time-decay function applied to the portion of the second subset;
(2) utilizing the first subset corresponding to the input values to predict the second subset corresponding to the output values; and
(2) minimizing an error associated with the cost function based at least in part on the utilizing;
receive an indication of at least one item consumption event associated with a user; and
process the at least one item consumption event with the prediction model to generate predicted item consumption events specific to the user.

7. The system of claim 6, wherein the first subset of the set of past item consumption events and the second subset of the set of past item consumption events are identified based on a floating date threshold.

8. The system of claim 6, wherein the prediction model is retrained on a periodic basis.

9. The system of claim 8, wherein retraining the prediction model comprises updating both the identified first subset of the set of past item consumption events and the second subset of the set of past item consumption events.

10. The system of claim 6, wherein the item consumption events comprise transactions for items in an electronic catalog.

11. The system of claim 10, wherein the transactions for items in an electronic catalog include purchases of one or more items by a plurality of users.

12. The system of claim 10, wherein the transactions for items in an electronic catalog include interactions with one or more websites associated with items in the electronic catalog.

13. The system of claim 6, wherein the at least one item consumption event associated with the user is a prediction of an item consumption event likely to be performed by the user.

14. A non-transitory computer readable medium storing specific computer-executable instructions that, when executed by a processor, cause a computer system to, at least:
identify a first set of consumption events within a data store that meet a first condition;
identify a second set of consumption events within a data store, the second set of consumption events comprising:
at least a portion of the first set of consumption events; and
a plurality of additional consumption events;
train a prediction model, wherein training the prediction model includes at least:
(1) determining a cost function based at least in part on a time-decay function applied to the portion of the first set of consumption events within the second set of consumption events;
(2) utilizing the first set of consumption events to predict the second set of consumption events;
(3) minimizing an error associated with the cost function based at least in part on the utilizing; and
upon receiving a set of consumption events associated with a user, generate predictive consumption events to be associated with the user based at least in part on the trained prediction model.

15. The computer readable medium of claim 14, wherein generating predictive consumption events to be associated with the user is also based at least in part on at least one of item features or user features.

16. The computer readable medium of claim 14, wherein the prediction model includes at least one activation function.

17. The computer readable medium of claim 14, wherein training the prediction model uses at least one machine learning technique.

18. The computer readable medium of claim 17, wherein the cost function includes an element weighing an individual consumption event inversely proportional to a popularity of that individual consumption event.

19. The computer readable medium of claim 14, wherein the cost function assigns a weight to each item consumption event based on whether an item associated with the item consumption event was consumed.

20. The computer readable medium of claim 14, wherein the first set of consumption events is subjected to a second time-decay function.

* * * * *

UNITED STATES PATENT AND TRADEMARK OFFICE
CERTIFICATE OF CORRECTION

| | | |
|---|---|---|
| PATENT NO. | : 10,635,973 B1 | Page 1 of 1 |
| APPLICATION NO. | : 15/195515 | |
| DATED | : April 28, 2020 | |
| INVENTOR(S) | : Leo Parker Dirac et al. | |

It is certified that error appears in the above-identified patent and that said Letters Patent is hereby corrected as shown below:

In the Claims

Column 20, Line 32, Claim 1:
Delete: "(1) involves determining a cost function based at"
Insert --(1) determining a cost function based at--

Column 21, Line 1, Claim 6:
Delete: "(1) involves determining a cost function based at"
Insert --(1) determining a cost function based at--

Column 21, Line 7, Claim 6:
Delete: "(2)_minimizing an error associated with the cost"
Insert --(3) minimizing an error associated with the cost--

Signed and Sealed this
Fifteenth Day of September, 2020

Andrei Iancu
*Director of the United States Patent and Trademark Office*